US008275145B2

(12) United States Patent
Buck et al.

(10) Patent No.: US 8,275,145 B2
(45) Date of Patent: Sep. 25, 2012

(54) VEHICLE COMMUNICATION SYSTEM

(75) Inventors: Markus Buck, Biberach (DE); Tim Haulick, Blaubeuren (DE); Gerhard Uwe Schmidt, Ulm (DE)

(73) Assignee: Harman International Industries, Incorporated, Karlsbad (DE)

( * ) Notice: Subject to any disclaimer, the term of this patent is extended or adjusted under 35 U.S.C. 154(b) by 1166 days.

(21) Appl. No.: 11/740,164

(22) Filed: Apr. 25, 2007

(65) Prior Publication Data

US 2007/0280486 A1 Dec. 6, 2007

(30) Foreign Application Priority Data

Apr. 25, 2006 (EP) .................................... 06008503

(51) Int. Cl.
*H04B 1/00* (2006.01)
*H04R 3/00* (2006.01)

(52) U.S. Cl. ........................... 381/86; 381/119; 381/122

(58) Field of Classification Search .................... 381/86, 381/302, 104, 107, 119, 122; 455/345

See application file for complete search history.

(56) References Cited

U.S. PATENT DOCUMENTS

| | | | | |
|---|---|---|---|---|
| 4,866,776 | A * | 9/1989 | Kasai et al. | 381/302 |
| 5,528,698 | A * | 6/1996 | Kamei et al. | 382/100 |
| 6,363,156 | B1 * | 3/2002 | Roddy | 381/86 |
| 6,535,609 | B1 * | 3/2003 | Finn et al. | 381/86 |
| 7,039,197 | B1 * | 5/2006 | Venkatesh et al. | 381/86 |
| 7,113,201 | B1 * | 9/2006 | Taylor et al. | 348/14.08 |
| 7,415,116 | B1 * | 8/2008 | Fels | 381/86 |
| 2002/0102002 | A1 | 8/2002 | Gersabeck et al. | 381/110 |
| 2002/0197967 | A1 | 12/2002 | Scholl et al. | 455/118 |
| 2004/0042626 | A1 | 3/2004 | Balan et al. | |
| 2004/0170286 | A1 | 9/2004 | Durach et al. | 381/71.4 |
| 2005/0152562 | A1 | 7/2005 | Holmi et al. | 381/86 |
| 2006/0023892 | A1 | 2/2006 | Schultz | 381/58 |

FOREIGN PATENT DOCUMENTS

CN 1624755 A 6/2005

* cited by examiner

*Primary Examiner* — Xu Mei

(74) *Attorney, Agent, or Firm* — The Eclipse Group LLP

(57) ABSTRACT

The present invention relates to a vehicle communication system comprising a plurality of microphones adapted to detect speech signals of different vehicle passengers, a mixer combining the audio signal components of the different microphones to a resulting speech output signal, a weighting unit determining the weighting of the audio signal components for the resulting speech output signal, where the weighting unit determines the weighting of the signal components based upon non-acoustical information about the presence of a vehicle passenger.

24 Claims, 3 Drawing Sheets

VEHICLE COMMUNICATION SYSTEM

RELATED APPLICATIONS

This application claims priority of European Patent Application Serial Number 06 008 503.2, filed Apr. 25, 2006, titled VEHICLE COMMUNICATION SYSTEM; which application is incorporated by reference in its entirety in this application.

BACKGROUND OF THE INVENTION

1. Field of the Invention

This invention relates to a vehicle communication system and to a method for controlling speech output of the vehicle communication system.

2. Related Art

Communication systems are often incorporated into vehicles for such uses as hands-free telephony with someone outside the vehicle. These systems, however, can have the problem of detecting false audio signals from sources other than the intended speaker. The unintended audio signals can come from vehicle noises, but even when extraneous vehicle noises are eliminated, speech signals from other passengers in the vehicle are often detected. This detection of false audio signals can reduce the resolution quality of the intended speech signal. Thus, a need exists for a vehicle communication system in which the resulting speech output signal accurately reflects the actual presence and speech of the passenger or passengers inside the vehicle utilizing the system.

SUMMARY

Accordingly, in one example of an implementation, a vehicle communication system is provided. The system includes (i) a plurality of microphones adapted to detect speech signals of different vehicle passengers, each microphone producing an audio signal component; (ii) a mixer that combines the audio signal components of the different microphones to produce a resulting speech output signal; and (iii) a weighting unit that determines the weighting of the audio signal components for the resulting speech output signal. The weighting unit takes into account non-acoustical information about the presence of a vehicle passenger when determining the weighting of the signal component.

In another example of an implementation, a vehicle communication system may further include a passenger detecting unit that detects the presence of non-occupied vehicle seats. The passenger detecting unit may receive signals from seat detection sensors, such as pressure or image sensors. The weighting unit may then set the weighting of audio signal components of non-occupied seats to zero.

Another example of an implementation provides a method for controlling the speech output of a vehicle communication system. The method includes (i) detecting speech signals of at least one vehicle passenger using a plurality of microphones, each microphone producing a speech signal component; (ii) weighting the speech signal components detected by the different microphones; and (iii) combining the weighted speech signal components to a resulting speech output signal. The weighting of the different speech signal components may take into account non-acoustical information about the presence of vehicle passengers.

In all example of an implementation, the method for controlling the speech output of a vehicle communication system may further include detecting the presence of non-occupied seats. In this method, the weighting of signal components of non-occupied seats may be set to zero.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
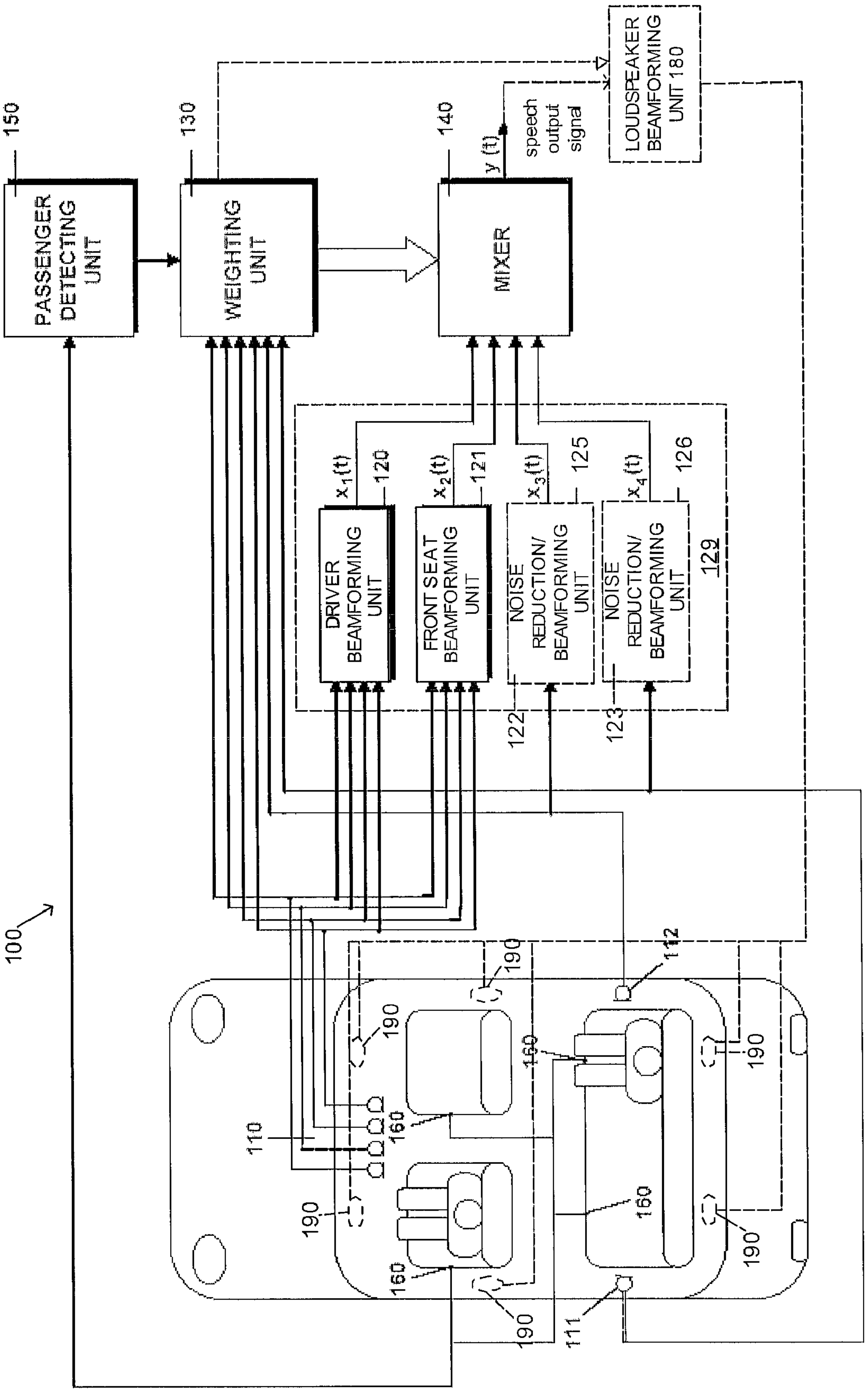
FIG. 1 is a schematic block diagram of a vehicle communication system that takes into account non-acoustical information on passenger seat occupancy.
Figure 2:
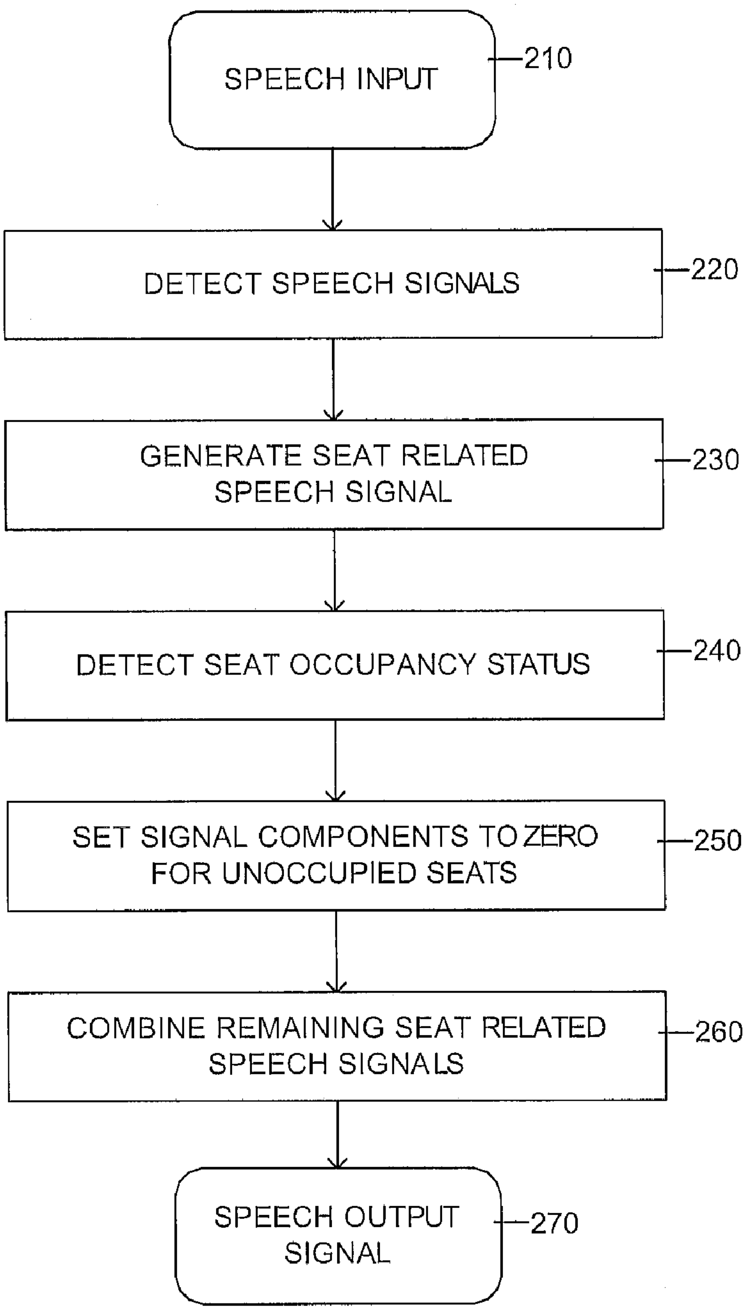
FIG. 2 is a flowchart representing an example of a method for optimizing the detected speech signal based upon vehicle seat occupancy status in the communication system illustrated in FIG. 1.
Figure 3:
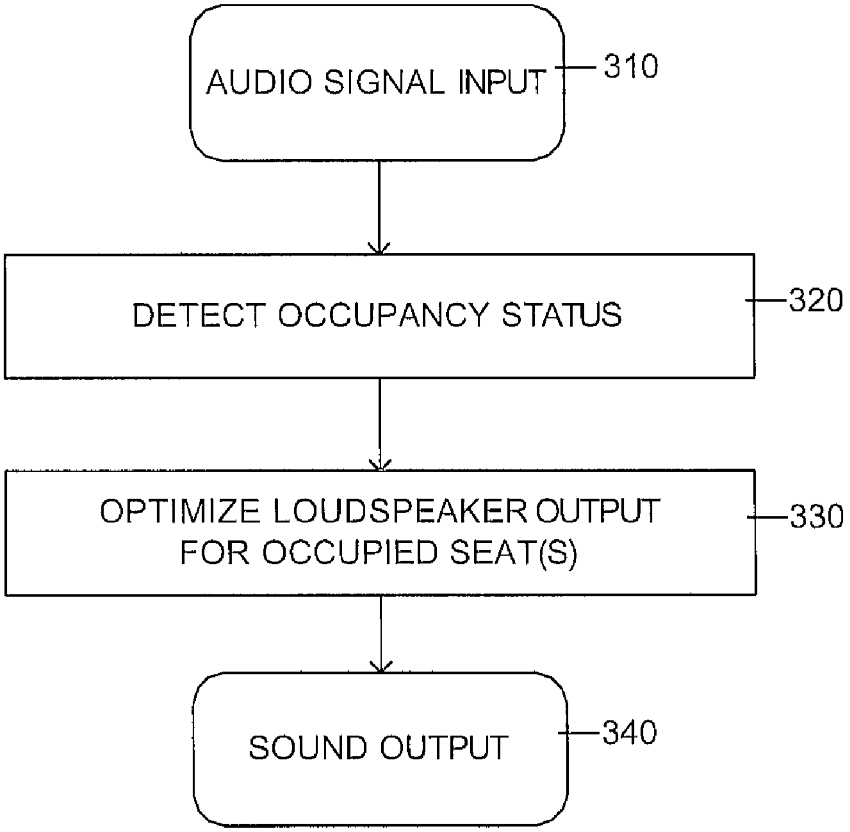
FIG. 3 is a flowchart representing an example of a method for optimizing loudspeaker output based upon vehicle seat occupancy status in the communication system illustrated in FIG. 1.

FIGS. 1-3 illustrate various implementations of a vehicle communication system and methods for optimizing detected speech signals and loudspeaker output based upon vehicle seat occupancy status.

In particular, FIG. 1 illustrates a vehicle communication system 100 according to one implementation. As explained further below, the vehicle communication system 100 of FIG. 1 generates a speech output signal utilizing non-acoustical information about the presence of passengers in the various seat locations to optimize the detected signal. The vehicle communication system 100 is thus adapted to detect speech signals of different vehicle passengers.

As described generally above, the communication system 100 may includes several microphones for picking up the audio signals of the passenger or passengers. In the implementation illustrated in FIG. 1, four microphones are positioned in a microphone array 110 in the front of the vehicle for detecting the speech signals originating from the driver's seat and from the front passenger seat. Additionally, a back, left-side microphone 111 is provided for detecting the speech signals of a passenger sitting in the back on the left side of the vehicle and a back, right-side microphone 112 is arranged for picking up the speech signals of a person sitting in the back on the light side of the vehicle.

One or more microphone arrays such as the front seat microphone array 110 illustrated in FIG. 1 may be used for detecting the audio signals from the different vehicle seat locations. The one or more microphone arrays may include four microphones as illustrated in FIG. 1, two microphones or any number of microphones. Moreover, the location of the one or more microphone arrays and, in particular the microphone array 110, may be in any of a number of positions in the vehicle as long as the speech signals from the driver and from the front seat passenger can be detected. Further, additional microphones or microphone arrays (not shown) may detect speech from passengers in the back seat if such passengers are present.

The microphone allay 110 provides a directional pick-up of the voice signal of a vehicle passenger based upon passenger location in the front seat of the vehicle. Such direction-limited audio signal pick-up is also known by the expression “beamforming”. As such, the four microphones of the microphone array 110 provide a signal component to the driver beamformer unit 120 to produce driver signal component $x_1(t)$. In the driver beamformer unit 120, the signals of the four microphones from the microphone array 110 are processed in such a way that signals originating from the direction of the driver's seat predominate. The same is done for the front passenger seat, where the signal from the four microphones of the array 110 is processed by the front seat beamformer unit 121 to produce front passenger seat signal component $x_2(t)$. The back, left-side microphone 111 and the back, right-side microphone 112 pick up the speech signals of the seats in the back on the left and right side, respectively.

In the example of an implementation shown in FIG. 1, only the right side back seat is occupied so that only microphone 112 is used and a beamforming unit 125 and 126 for the back seat is not necessary. As illustrated, in other passenger configurations such as where both back seats are occupied, back seat beamforming units 125 and 126 may be utilized to produce back seat signal component $x_3(t)$ and $x_4(t)$, respectively.

While the beamforming units 120, 121, 125 and 126 and noise reduction units 122 and 123 may be separate units, those skilled in the art may recognize that all or one of these units may be combined together in a single unit. For example, the beamforming units 120, 121, 125 and 126 may be a single beamforming unit 129.

In the example of an implementation shown in FIG. 1, the speech signal from the right side back-seat microphone 112 is processed by a light-side-back noise reduction unit 122 using one or more noise reduction algorithms. The resultant signal produced is right-side-back signal component $x_3(t)$. Similarly, the speech signal detected by the left-side microphone 111 is processed by the left-side-back noise reduction unit 123 to produce left-side-back signal component $x_4(t)$.

The system 100 further provides a mixer 140 that combines the audio signal components of the different microphones, including those in the microphone array 110 and the back, left-side microphone 111 and the back, right-side microphone 112, to produce a resulting speech output signal y(t). A weighting unit 130 determines the weighting of the audio signal components that make-up the resulting speech output signal, y(t). The weighting unit 130 determines the weighting of the signal components by taking into account non-acoustical information about the presence or absence of vehicle passengers by utilizing passenger detecting sensors that are pressure sensors 160 and passenger detecting unit 150. This non-acoustic information can determine with a high probability whether a vehicle passenger is present on a particular vehicle seat location. Although it is possible to use only acoustical information for determining the weighting of the different signal components, systems based solely upon such an acoustical approach do not provide a high level of certainty that information on whether a particular acoustical signal is coming from a predetermined vehicle seat location. Non-acoustical information based upon detection devices can, however, more accurately determine whether a vehicle seat is occupied. This increased level of certainty as to seat position occupancy allows the communication system 100 to generate a more accurate speech output signal that takes into account only signal, components from vehicle seats that are occupied by a passenger. The system may enhance signal components from occupied seat positions as well as reduce or eliminate signal components from unoccupied vehicle seat positions.

In one example of an implementation shown in FIG. 1, the vehicle seat detection sensors 160 for seat occupancy may be pressure sensors. The weighting unit 130 then determines the weighting of the audio signal components based upon signals from the pressure sensors. The pressure sensors can determine with a high accuracy whether a passenger is sitting on a vehicle seat or not. When the pressure sensor of a particular vehicle seat determines that no one is sitting on that seat, the weighting for the signal components for the seat may then be set to zero. Thus, in this implementation, the system determines which seats are empty and then, in the weighting unit, the system sets the weighting factors to zero for the audio signal components from the empty seats.

In another example of an implementation also shown in FIG. 1, the seat detection sensors 160 for seat occupancy may be image sensors. In implementations that utilize image sensors, the weighting unit determines the weighting of the audio signal components based upon signals from the image sensor. By way of example, the image sensor may be a camera that takes pictures of the different vehicle seats. When no passenger is detected on a vehicle seat, the weighting for the microphones for that vehicle seat may be set to zero. The audio signal components from other vehicle seats for which a passenger is detected may then be combined or weighted according to other factors such as from the detected acoustical information itself. This weighting based, in particular, on elimination of signal components from unoccupied seats greatly improves the quality of the resulting speech output signal. When the image sensor is a cameras, it is also possible to generate moving pictures. The moving pictures may then provide information such as whether a passenger's lips are moving. Such information may then be used for determining not only which vehicle seats are occupied but also which passenger is speaking. When it is determined that a particular passenger is not speaking, the audio signal from the microphone or microphones associated with that passenger may then be suppressed. This further improves the weighting of component signals from occupied seats by selecting those signal components arising from passengers that are actually speaking.

The example shown in FIG. 1 is, thus, an implementation in which a seat-related speech signal is determined for each of the different vehicle positions. In this implementation four different passenger positions are possible for which the speech signals are detected. For each passenger position, a signal $x_p(t)$ is calculated. From the different passenger position signals $x_p(t)$ a resulting speech output signal y(t) is calculated using the following equation:

$$y(t) = \sum_{p=1}^{P} a_p(t)x_p(t)$$

In the equation shown, the maximum number of passengers participating at the communication is P and $a_p(t)$ is the weighting factor for the different users of the communication system. As can be seen from the above equation the weighting depends upon time. Further, the resulting output signal is weighted so as to predominantly include only signal components from the passengers that are actually speaking. The weighting of the different signal components is determined in a weighting unit 130. In the weighting unit 130 the different weightings $a_p(t)$ are calculated and fed to a mixer 140 that mixes the different vehicle seat speech signals to generate an resulting speech output signal y(t). Furthermore, a passenger detecting unit 150 is provided that uses non-acoustical information about the presence of a vehicle passenger for the different vehicle seat positions. The passenger detecting unit 150 may use different sensors 160 that may be, by way of example, pressure sensors that detect the presence of a passenger in the different vehicle seats. Further, it is possible that the sensors 160 are image sensors that may be a camera that takes pictures of the different vehicle seat positions. When a camera is used, the video information may also be used for detecting the speech activity of a passenger by detecting the movement of the lips. Thus, when the lips of a passenger are detected as moving, the system 100 determines that the passenger is speaking and accordingly increases the weighting of the signal from that passenger. In addition or the alternative, when the lips of a passenger are not detected as moving, the system may determine that the passenger is not speaking and accordingly, the weighting may be decreased or assigned a value of zero for signal from that passenger. In the example shown in FIG. 1, no passenger occupancy would be detected for right-side front seat and the left-side back seat, and consequently, the weighting coefficients for the seat-related speech signal $x_p(t)$ would, therefore, be set to zero for those seat locations. Thus, in the implementation shown in FIG. 1, the weighting for the signal $x_2(t)$ and $x_4(t)$ would be set to zero so that signal components from these vehicle seats would not contribute to the resultant output signal y(t).

FIG. 1 also illustrates an example of an implementation in which the output is converted into a directionally targeted sound using loudspeaker beamforming unit 180 and a combination of loudspeakers 190 as more fully illustrated in FIG. 3 and discussed below. This beamforming Unit 180 and associated loudspeaker components 190 may be present in some implementations, but need not be present in all implementations of vehicle communication system 100.

In one possible example of an implementation of such a directed output loudspeaker beamforming unit 180, the weighting unit 130 would receive information from seat position sensors 160 such as pressure sensors or image sensors and set weighting factors to zero for unoccupied seat positions such that the loudspeaker beamforming unit 180 directs the output of loudspeakers 190 only to occupied seat positions.

FIG. 2 is a flowchart illustrating an example of a method for optimizing detected speech signals based upon vehicle passenger occupation status in the vehicle communication system illustrated in FIG. 1. In the figure, the different steps for calculating an output signal y(t) are shown. The process starts with speech input 210 that represents the speaking of a passenger or passengers utilizing the system. In the next step 220 the speech signals are detected utilizing the different microphones positioned in the vehicle, such as those microphones 110, 111 and 112 illustrated in the block diagram in FIG. 1. As illustrated in the FIG. 1, the speech signals are detected using the front seat microphone array 110, the back-left-side microphone 111 and back-right-side microphone 112.

In step 230 of FIG. 2, the speech signals detected by the microphones 110 to 112 are combined to generate a vehicle seat-related speech signal $x_p(t)$ for each vehicle seat. Further, the occupancy status of the different vehicle seats is detected in step 240. By way of example, the occupancy status may be detected as described in connection with FIG. 1 by utilizing seat detections sensors 160, such as seat pressure sensors or image sensors. It is also possible to utilize a combination of both. This allows the detection of the occupancy status of the different vehicle seat positions. Based upon this determination of occupancy status, the signal components from seat positions for which no passenger is detected, are set to zero in step 250. This eliminates signal components detected by microphones associated with unoccupied seat positions. After setting signal components of unoccupied seats to zero, the remaining seat-related speech signals are combined in step 260. Further weighting of signal components from occupied seats is possible, for example, by utilizing image detectors such as cameras and determining which passenger is actually speaking as described above. The process ends with the speech output signal 270 that represents the output signal generated by the system.

FIG. 3 is a flowchart representing an example of a method for optimizing loudspeaker output in the vehicle communication system illustrated in FIG. 1. The flowchart illustrates the manner by which information about the presence of a passenger in a vehicle seat position may be utilized for improving the audio signal output from loudspeakers such as loudspeakers 190 shown in. FIG. 1. The audio signal input 310 for the illustrated process may be any audio or speech signal including a speech signal that has been processed according to the examples as illustrated in FIGS. 1 and 2. Then, in the subsequent step 320, the occupancy status of the different vehicle seats is detected. This detection may be based upon detection sensors 160 as illustrated in FIG. 1 such as pressure sensors or image sensors that may be one or more cameras. It is also possible to use a combination of pressure sensors and image sensors for ascertaining seat position occupancy. For vehicle seat positions in which no passenger is present, the audio output would not be directed toward such seat positions. This may be achieved by using a loudspeaker beamforming unit 180 and a combination of loudspeakers 190 such that a sound beam is formed and directed toward occupied vehicle seats. The system thus determines that a particular vehicle seat is occupied and another is not occupied. For example, as is illustrated in FIG. 1, the driver seat is occupied, but the seat next to the driver is not occupied. In this example, the loudspeakers may be controlled in such a way that the sound beam is directed to the occupied driver seat or the occupied back right scat, step 330, using loudspeaker beamforming unit 180 and loudspeakers 190 as shown in FIG. 1. With this audio output loudspeaker beamforming, the sound may thus focus the audio output toward the person or persons actually present and sitting on the particular vehicle seat positions. This may be facilitated by applying a weighting factor of zero for the sound beam directed toward empty seats. The beamforming approach also has the further advantage of being able to direct the sound more precisely to the passenger's head rather than to the microphones that pick up speech signals of that passenger, thus reducing possible interference. The process ends in sound output step 340 that represents the production of the audio sounds by loudspeakers 190 of the system.

The loudspeaker beamforming approach using several loudspeakers 190 allows targeting of the sound to a particular passenger. One possible way of achieving this is, for example, by introducing time delays in the signals emitted by different loudspeakers. Thus, if the system determines that a certain vehicle seat is occupied and others are not occupied, the loudspeakers 190 of the vehicle communication system may be optimized for the person or persons who are actually present in the vehicle. This loudspeaker beamforming of the audio signal may be done with any audio signal emitted by the loudspeaker, whether the emitted sound is music or a voice signal such as might occur where communication is intended to a particular person in the vehicle.

The loudspeakers 190 of the communication system represented in FIG. 3 may be located close to a particular passenger and used for play back signals for that passenger. If, however, one or more of the vehicle seats are not occupied, the play back signals over loudspeakers 190 targeted to vehicle seat positions that are unoccupied, are reduced. This reduces the risk of "howling" feedback and improves system stability.

Surround sound systems are intended to optimize sound quality and sound effects for the different seats. Because such systems attempt to improve the sound quality for all seats there is always a compromise for the quality of a particular seat. In contrast, the method exemplified in FIG. 3 for use in connection with a communication system, such as illustrated in FIG. 1, need not optimize the sound quality of an unoccupied position and the sound output directed toward such an unoccupied position can be reduced. This allows the system to optimize the sound quality for the other seat positions that are occupied.

Thus, the vehicle communication system 100 as exemplified in FIG. 1 and the method for use of the system 100 exemplified in FIGS. 2-3, provides a system and method for enhancing audio or speech output signal, by utilizing signal components from occupied seat positions and excluding signal components from unoccupied seat positions. Audio signal components from microphones positioned in the neighborhood of vehicle seats on which no passenger is sitting are effectively eliminated. The output signal is thus limited to signal components from occupied seats. As a result, fewer signals have to be considered in generating the output signal. Enhancement may be further or separately achieved by controlling the loudspeaker 190 output in a beamforming manner to direct the audio or speech output to occupied seat positions in preference to unoccupied seat positions.

The vehicle communication system 100 as shown in FIG. 1 may be used for different purposes. For example, it is possible to use the human speech for controlling predetermined electronic devices using a speech command. Additionally, telephone calls in a conference call are possible with two or more subscribers within the vehicle and a third party outside the vehicle. In this example, a person sitting on a front seat and a person sitting on one of the back seats may talk to a third person on the other end of the line using a hands-free communication system inside the vehicle. It is also possible to utilize the communication system 100 inside the vehicle for the communication of one vehicle passenger to another vehicle passenger such as the communication of a passenger in a back seat with a passenger in a front seat. Moreover, it is possible to use any combination of the communications described above.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A vehicle communication system comprising:

a plurality of microphones configured to detect audio signals including speech signals of at least one vehicle passenger;

a beamforming unit configured to receive the audio signals from the plurality of microphones and to generate a plurality of audio signal components corresponding to vehicle seat positions;

a mixer combining the audio signal components to produce a resulting speech output signal;

a seat occupancy detecting unit to detect the presence of non-occupied vehicle seats;

a weighting unit configured to determine a weighting for each of the audio signal components, where the weighting unit sets the weighting of audio signal components of non-occupied seats to zero and where the weightings are applied when the audio signal components are combined to produce the resulting speech output signal; and an output loudspeaker beamforming unit, where the loudspeaker beamforming unit directs the output of loudspeakers only to occupied seat positions.

2. A method for controlling a speech output of a vehicle communication system, the method comprising:

detecting speech signals of at least one vehicle passenger using a plurality of microphones, each microphone producing an audio signal;

generating a plurality of audio signal components corresponding to a plurality of vehicle seat positions using the audio signals from the microphones;

applying a weighting to each of the audio signal components, the weightings based upon a combination of acoustical and non-acoustical information about the presence of vehicle passengers; and combining the weighted audio signal components to generate a resulting speech output signal.

3. The method of claim 2, where the weighting for the signal components for a predetermined vehicle seat position is set to zero when it is detected that there is no passenger in the vehicle seat position.

4. The method of claim 2, where the resulting speech output signal is used for the voice controlled operation of a vehicle component.

5. The method of claim 2, where the resulting speech output signal is used for a conference call with an external subscriber and at least two vehicle passengers.

6. The method of claim 2, where the resulting speech output signal is used for communication of different vehicle passengers with each other.

7. The method of claim 2, further including adding the different weighted signal components detected by the microphone to the resulting speech output signal.

8. The method of claim 2, further including controlling the output of the resulting speech output signal with a plurality of loudspeakers depending upon the non-acoustical information about the presence of a vehicle passenger for a predetermined vehicle position.

9. The method of claim 8, where the output of the resulting speech output signal produced by the loudspeakers is optimized for a vehicle seat position, for which it has been determined that a passenger is present.

10. The method of claim 2, where the signal of a seat pressure sensor is used for detecting the presence of a passenger.

11. The method of claim 2, where the signal of an image sensor is used for detecting the presence of a passenger.

12. The method of claim 2, where detecting the speech signal of a vehicle passenger is based upon the signal from an image sensor, where the image sensor generates moving pictures to determine whether a passenger's lips are moving, and where the components of the resulting speech output signal are weighted based upon signal components arising from passengers that are actually speaking.

13. A method of controlling a speech output of a vehicle communication system, the method comprising:

detecting speech signals of at least one vehicle passenger using a plurality of microphones, each microphone producing an audio signal;

generating a plurality of audio signal components corresponding to a plurality of vehicle seat positions using the audio signals from the microphones;

applying a weighting to each of the audio signal components, the weightings based upon a combination of acoustical and non-acoustical information about the presence of vehicles passengers;

combining the weighted audio signal components to generate a resulting speech output signal;

detecting the presence of non-occupied seats, where the weighting of signal components of non-occupied seats is set to zero; and routing the resulting speech output signal to a unit, where the unit directs the output of loudspeakers only to occupied seat positions.

14. A vehicle communication system comprising:

a plurality of microphones adapted to detect speech signals of different vehicle passengers, each microphone producing an audio signal;

a beamforming unit configured to receive the audio signals from the plurality of microphones and to generate a plurality of audio signal components corresponding to vehicle seat positions;

a mixer combining the audio signal components to produce a resulting speech output signal; and a weighting unit determining the weighting of the audio signal components for the resulting speech output signal, where the weighting unit determines the weighting of the signal components based upon a combination of acoustical and non-acoustical information about the presence of a vehicle passenger.

15. The vehicle communication system of claim 14, further including a detection sensor electronically coupled between at least one seat of the vehicle and the weighting unit, where the weighting unit determines the weighting of the audio signal components based upon signals received from the detection sensor.

16. The vehicle communication system of claim 15, where the detection sensor is a vehicle seat pressure sensor.

17. The vehicle communication system of claim 15, where the detection sensor is an image sensor.

18. The vehicle communication system of claim 17, where the image sensor is a camera that takes pictures of different vehicle seats and when no passenger is detected on a vehicle seat, the weighting for one or more microphones assigned to pick-up speech from a passenger sitting on that vehicle seat is set to zero.

19. The vehicle communication system of claim 17, where the image sensor is a camera that takes pictures of different vehicle seats and provides information for determining whether a particular passenger is speaking, and when it is determined that a particular passenger is not speaking, the audio signal from one or more microphones assigned to pick-up speech from that passenger is suppressed.

20. The vehicle communication system of claim 14, further including a plurality of loudspeakers for outputting the resulting speech output signal, where the use of the different loudspeakers depends upon the information about the presence of a vehicle passenger.

21. The vehicle communication system of claim 14, where an image sensor detects the speech activity of a vehicle passenger.

22. The vehicle communication system of claim 14, further including a beamforming unit that generates the audio signal components based on the audio signals detected from the plurality of microphones picking up speech signals from one or more passengers sitting on vehicle seats.

23. The vehicle communication system of claim 14, further including a loudspeaker beamforming unit electronically coupled between the weighting unit, mixer, and one or more loudspeakers, where the loudspeaker beamforming unit receives information from the weighting unit regarding the presence of a passenger at a predetermined vehicle seat position and directs the output of loudspeakers only to vehicle seat positions occupied by a passenger.

24. The vehicle communication system of claim 14, where if the presence of a passenger at a predetermined vehicle seat position cannot be detected, the weighting unit sets the weighting of the signal components of the vehicle seat position to zero.

* * * * *

UNITED STATES PATENT AND TRADEMARK OFFICE

CERTIFICATE OF CORRECTION

PATENT NO. : 8,275,145 B2
APPLICATION NO. : 11/740164
DATED : September 25, 2012
INVENTOR(S) : Markus Buck, Tim Haulick and Gerhard Uwe Schmidt It is certified that error appears in the above-identified patent and that said Letters Patent is hereby corrected as shown below:

Column 1
Line 65, please delete "all" and insert -- an --

Column 2
Line 57, please delete "light" and insert -- right --

Column 3
Line 4, please delete "allay" and insert -- array --

Column 3
Line 36, please delete "light" and insert -- right --

Column 4
Line 33, please delete "cameras" and insert -- camera --

Column 5
Line 34, please delete "Unit" and insert -- unit --

Column 6
Line 41, please delete "scat" and insert -- seat --

Signed and Sealed this
Twenty-second Day of January, 2013

David J. Kappos
*Director of the United States Patent and Trademark Office*